Dec. 27, 1938. G. A. TINNERMAN 2,141,700
TRIM PANEL ASSEMBLY
Filed June 11, 1937
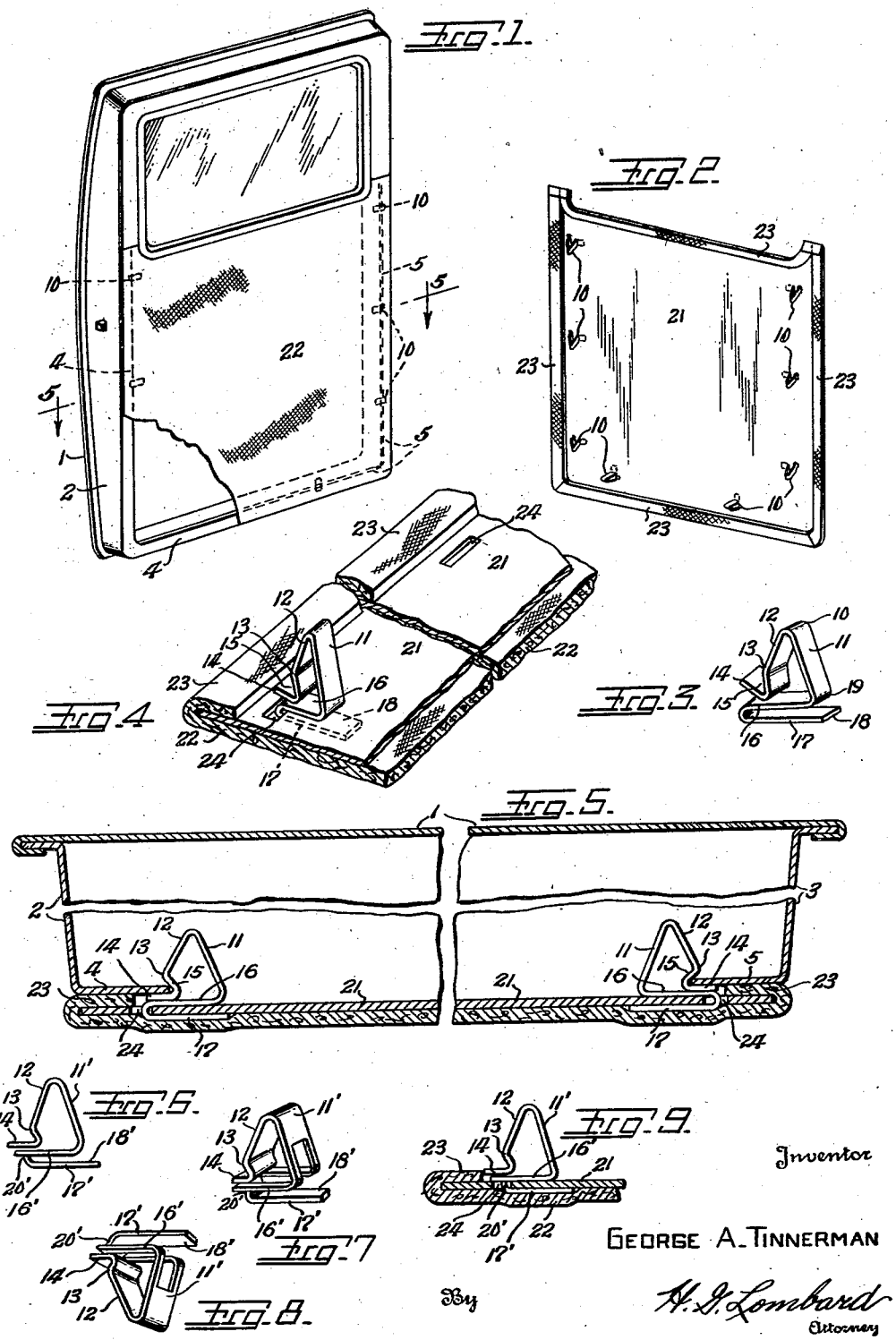
Inventor
GEORGE A. TINNERMAN
By H. J. Lombard
Attorney Patented Dec. 27, 1938

2,141,700

UNITED STATES PATENT OFFICE 2,141,700

TRIM PANEL ASSEMBLY

George A. Tinnerman, Rocky River, Ohio, assignor to Albert H. Tinnerman, Cleveland, Ohio Application June 11, 1937, Serial No. 147,746

3 Claims. (Cl. 45—138)

This invention relates to trim panel assemblies and more particularly the type wherein an upholstered panel is mounted for use in the interior trim finish of the doors and other parts of automobile bodies.

According to the present practice, upholstery panels are mounted by the use of individual fastening devices secured on the inner concealed face of the panels adjacent the edges thereof and adapted to have a substantial snap fastening engagement in holes provided in the supporting structure.

In so mounting trim panels on all-metal structures, such as the doors of present day automobiles, this has required that the metal flanges of the door frames be subjected to a separate, expensive and time-consuming punching or drilling operation to provide the necessary holes serving as the complemental socket elements receiving the snap fastening devices for mounting a panel. In this respect, it is found, most often, that the arrangement of the stud devices on the panels is such that they are not in exact alignment with the holes provided in the flanges of the door frame thus resulting in a faulty assembly and/or requiring the operator to take time to align such of the snap fastenings which are not properly located on the panel. To overcome any such misalignment, various means have been resorted to requiring further expense and time in manufacturing and assembling operations. Most common of such means is the provision of a floating mounting for the snap studs such that they may have sufficient lateral shifting or floating movement on the panels to insure ready engagement in the holes even though not in exact registry therewith. To provide such a floating mounting a cage device, or the like, must be provided. The head of a stud fastening is then assembled into cooperative engagement for limited free movement in the cage device which, in turn, is rigidly secured in a separate operation to the panel. Such procedure obviously entails considerable time and expense and naturally is objectionable from the standpoint of cost of manufacture.

This invention therefore contemplates the provision of a new and improved trim panel assembly embodying a novel and improved method of mounting a trim panel on a supporting structure, simplifying the installation thereof and materially reducing costs in manufacture.

A further object aims to provide improved means for mounting a trim panel to a supporting structure utilizing the peripheral flanges thereof and thereby dispensing with the necessity for holes provided in the flanges of the supporting structure to receive the stud fastenings and the use of expensive auxiliary devices to furnish a floating mounting for the stud fastenings.

Another object of the invention is to provide a trim panel assembly in which the trim panel is provided with improved means for removably attaching the same with ease and facility in a direct application to a supporting structure utilizing the flange edges thereof.

A more specific object is the provision in such a trim panel assembly utilizing the flange edges of the supporting structure, of improved fastener means axially applied to have a substantial snap fastening engagement with the flange edges thereof, thereby dispensing with the necessity for buckling or otherwise distorting the panel to mount the same in position.

Further objects and advantages of the invention will be apparent to those skilled in the art as a description thereof proceeds with reference to the accompanying drawing in which like reference characters designate like parts throughout the same and in which:

Fig. 1 is a perspective view from the inside of a door frame supporting structure showing a trim panel mounted thereon, parts of the trim panel being broken away to disclose the flanges of the door frame.

Fig. 2 is a perspective view of the inner face of the trim panel, detached from the assembly of Fig. 1, showing the arrangement of the snap fastenings thereon.

Fig. 3 is a perspective of one form of snap fastening device.

Fig. 4 is a detail perspective of a trim panel section showing the method of securing a fastening device thereto.

Fig. 5 is a section taken on line 5—5, of Fig. 1, illustrating the fastening engagement of the fastening devices with the flange edges of the door frame.

Fig. 6 is an edge elevation of a modified form of stud fastening.

Fig. 7 is a perspective of Fig. 6.

Fig. 8 is another perspective of the stud fastening represented in Fig. 6.

Fig. 9 shows the stud fastening illustrated in Figs. 6-8 inclusive as attached to a trim panel section.

In mass production, to conserve space large stocks of upholstered panels are stacked one upon the other ready for use, and naturally it becomes inexpedient to have the stud fastening devices applied to and forming a part of the trim panels because of the fact that the studs of one panel will damage the upholstery fabric of the panel which bears against it. It has therefore been found most expedient to have the assembly of the stud fastenings with the panels as simple as possible and of such form that the studs may be easily and quickly attached to the trim panels by the operator just prior to their application to the door frame or other supporting structure.

In the trim panel assembly of this invention, the fastening means proposed are relatively cheap and simple to manufacture, easily and quickly fastened to a panel to be mounted and otherwise admirably suited for providing a panel installation which cannot become unsatisfactory or loose in its mounting after a period of use, or become unserviceable after repeated dismountings of the panel to obtain access to concealed parts in the supporting structure. In providing such an arrangement, this invention contemplates an upholstered panel the base of which is provided on its inner concealed face with relatively narrow, elongated slots disposed at intervals and in suitable spaced relation to the peripheral edges of the trim panel. These slots being relatively narrow and spaced inwardly of the edges of the panel do not weaken the same or affect its efficiency in an installation and, at the same time, are admirably suited for receiving an element of the fastening means to connect the same in operative position on the panel.

Referring to the drawing, Fig. 2 shows generally the arrangement of the stud fastenings on the inner concealed face of a trim panel preparatory to the application thereof to a door frame supporting structure as exemplified in Fig. 1. The snap fastenings designated generally at 10 may be constructed of a blank or strip section of any suitable material such as spring steel, sheet metal, cold rolled metal, wire, or the like. And since the fastenings function as substantial clip devices in their engagement with the trim panel, head elements for the same are not necessary whereupon the devices may be constructed most economically from a small, rectangular strip section of metal sheet material without loss or waste of material whatsoever. The strip section is fashioned, as shown in Fig. 3, into what may be termed a double-ended clip device to provide a member which embodies a substantial V-shape shank comprising relatively yieldable legs 11, 12, and a cooperating member in the form of a substantial U-shaped clip obtained by a return bend to present cooperating finger elements 16, 17, the finger element 16 being integral with leg member 11 as at 19. The leg member 12 of the shank is suitably deformed adjacent its extremity to provide cooperating work engaging shoulders 13 and 14 which together present a substantial retaining pocket 15 into which the flange edge of a supporting structure is seated under tension as hereinafter more fully set forth. The shoulder 13 may be of any suitable design but preferably is in the form of a cam surface which is adapted to engage various thickness of supporting flanges and to compensate for possible inaccuracies and manufacturing variations in the supporting structure. The shoulder 14 may be substantially flat and of sufficient length to bear against the supporting surface immediately adjacent the flange edge to have a firm, snug seating in operative relation in the installation as shown in Fig. 5.

As represented in Fig. 4, upholstery trim panels include a relatively stiff, fibrous base panel or foundation body 21, and a suitable upholstery covering 22 applied to the outer face of the panel, the edges 23 of the upholstery covering being wrapped around the peripheral edges of the panel on the inner face thereof as illustrated in Fig. 2. In a completed trim panel, it is essential that the snap fastenings 10, be capable of quick, easy attachment to the panel just prior to the application thereof in an installation. In order that this may be done, the base panel may be provided with openings of any suitable form but preferably relatively narrow, elongated slots 24, spaced as most expedient and extending substantially parallel to the adjacent edge of the trim panel.

By the provision of such elongated slots 24 in the base panel 21, fastenings such as, for example, shown in Fig. 3 may be attached to a completed trim panel with ease and facility just prior to the application thereof in mounted relation on a supporting structure. This is readily accomplished by tilting or canting a fastening such that the projecting portion 18 of the finger element 17, Fig. 3, is entered into a slot 24 whereupon the fastening is moved in a direction away from the adjacent edge of the panel to be disposed in desired position with the finger element 17 cooperating with finger element 16 as substantial clip means to grippingly engage the base panel thickness to retain the snap fastening in operative position on the trim panel as shown in Figs. 4 and 5. In this manner, as many snap fastenings as are needed are attached to the panel and, as shown in Fig. 5, are so arranged that when the panel is applied to a supporting structure, the spring leg 12 and the shoulders 13, 14 carried thereby are disposed, beyond their leading ends, in the path of the inturned flange edges 4, 5 of the supporting structure.

Thus, in mounting a trim panel on the interior of a door frame supporting structure represented in Figs. 1 and 5, in which the door comprises a well known construction embodying a front finish panel 1, secured to channel-shaped frame supports 2, 3 including inturned flanges 4, 5, a completed upholstery trim panel provided with snap fastenings on the base thereof as above set forth, is applied to the frame support with the spring legs 12 of the fastenings disposed in the path of the edges of such inturned flanges. On pressure being applied to the panel in an axial direction with respect to the fastenings, the spring leg 12 of each fastening serves as a guide surface camming the adjacent flange edge to become tensioned and cause a gradual, relative contraction of the leg members 11, 12. Continued exertion of pressure axially of a fastening causes the spring leg 12 thereof to yield sufficiently to permit the shoulder 13 to pass the flange edge whereupon the flange itself snaps into the recess or pocket 15 in tensioned engagement with the spring leg 12. Since the shoulder 14 may be substantially flat, it is especially adapted to bear against the flange in solid engagement therewith to provide a fixed rigid mounting for the panel member. The rigidity of the mounting provided by this form of snap fastening is enhanced by the fact that the section providing the shoulder 14 is flat on its opposite face to have a substantial sliding bearing engagement with the head section 16 when in tensioned operative relation with the supporting flange. See Fig. 5.

In this relation it is to be noted that in each fastening, the U-shaped clip member, comprising cooperating finger elements 16, 17, is provided by a return bend in the direction in which the fastening is applied in the slot 24 to be retained in assembled relation on the base member of the trim panel. It will therefore be appreciated that the tensioned engagement of the spring leg 12 continuously urges the base of the said U-shaped clip member toward the side-wall of slot 24 and therefore not only effects a rigid engagement of the shank of the fastening with the supporting structure, but also urges the finger element 17 in a direction reverse to withdrawal from said slot 24 and thus insures that the clip member will be positively retained at all times in rigid cooperative engagement with the base panel 21 in the applied mounted position of the trim panel on a supporting structure.

From the foregoing it will be appreciated the trim panel assembly of this invention marks a decided advance in the art in that no perforations or holes need be provided in the flanges of the supporting structure to receive the fastening means, and the attendant cost involved in providing such holes in a separate punching or drilling operation is thereby eliminated.

The prior art constructions almost uniformly employ holes in the flanges to receive the fastening means; this naturally requires that the fastening means be shifted and adjusted to be aligned and placed in registry with their cooperating socket openings. In the instant invention this objectionable and time consuming procedure is unnecessary since the snap fasteners are designed to engage the supporting structure at the inturned flange edges thereof. And since such engagement is yieldable and is accomplished through the medium of an inherently resilient cam shoulder 13, Fig. 5, the proposed trim panel structure is admirably suited for use with supporting structures having different thickness of flanges and also is readily adapted to compensate for irregularities and manufacturing variations in mass production of supporting structures such as door frames.

To remove a trim panel from an installation such as above described to have access to the interior of the supporting structure for repairing the window operating parts of an automobile door for example, it is merely necessary to wedge the panel along its peripheral edges, away from the supporting structure whereupon the cam shoulder 13 of each snap fastening causes a relative contraction of the leg members sufficient to allow the spring leg 12 thereof to clear the flange edge with which it cooperates. This in no way deforms, mutilates or otherwise injures the fastening means and accordingly a trim panel may be dismounted and again mounted in the same installation any desired number of times and without diminishing the efficiency of the mounting.

Figs. 6-9 inclusive show a modified form of the snap fastening means which is advantageous in that a substantial saving in material may be obtained in providing the clip member of the device. The shank member of this form of the fastening may be substantially similar to that of the preferred form illustrated in Fig. 3. As best seen in Figs. 7 and 8, the finger element 17' including the projecting portion 18' may be obtained by striking a section from the cooperating finger 16' and leg 11'. This section is flattened to extend in a substantially parallel plane to the finger 16' being integral therewith as at 20'. As shown in Fig. 9, this form of the fastening device may be attached to a trim panel by substantially the same method to function in the same manner as the preferred form of snap fastening described above with reference to Figs. 3, 4 and 5.

It will be readily appreciated that the trim panel assembly herein disclosed may be embodied in equivalent constructions employing modified forms of snap fastenings constructed in different forms and from different material, as, for example, a clip device, constructed of wire and comprising a yieldable shank leg engaging the flange edge of a supporting structure.

Several types of panel supporting devices have heretofore been employed for engaging the flanges or other part of a supporting structure, and these types of devices are now well known. They usually comprise devices functioning as clasps, or expensive clinch strips which must be attached to the trim panel by separate fastening means and in a separate, expensive operation. Then again, in mounting the trim panel to the supporting structure, the panel must be buckled and distorted to permit the last applied clips or clinch strips to be seated in clasping engagement with the adjacent flange. This procedure naturally involves considerable time and added expense, and causes a permanent bulge in the panels such that they are unsightly and loose in their mounting on a support and thus subject to vibration causing squeaks, rattles and other objectionable noises incident to the use of the automobile. If by chance the mounting of the trim panel is rigid, it cannot be removed without considerable difficulty by the car owner or mechanic and without permanently distorting, deforming or otherwise multilating the fastening devices such that they are not efficient when again employed in the installation from which the panel is removed.

In contrast to such constructions, the instant invention provides a relatively inexpensive installation in which a trim panel for an automobile door may be readily applied in a minimum of operations without in any way buckling, distorting or otherwise damaging the trim panel, and also provides a yieldable, most effective, rigid mounting in which the trim panel is not subject to loosening from vibration yet is capable of being readily removed and again mounted in the same installation any number of times with little or no effort.

While this invention has been described in detail with specific examples such examples are illustrative only, since other modifications within the spirit and scope of the invention will be apparent to those skilled in the art. Hence the invention is to be understood as limited only as indicated in the appended claims in which the intent is to set forth all the novelty over the prior art.

What is claimed is:

1. A trim panel assembly comprising in combination, a supporting structure having a flange and presenting an area to be covered by a trim panel, a trim panel of relatively stiff material to be mounted on said supporting structure to cover said area and having a slot provided on its underface extending substantially parallel to the adjacent peripheral edge thereof, and fastening means carried by said panel adapted for resiliently contacting the edge of said flange to rigidly secure the trim panel in mounted position on the supporting structure, said fastening means comprising a yieldable member providing a shoulder capable of snap fastening engagement with the edge of said flange and an attaching member assembled in said slot provided on the panel in a direction opposed to the adjacent peripheral edge thereof, whereby said snap fastening engagement of the yieldable member with said flange edge permits the panel to be readily mounted or dismounted from said supporting structure and acts to urge said attaching member of the fastening means to positive engagement in its connection in the said slot provided on the trim panel.

2. A trim panel assembly comprising in combination, a supporting structure having a flange and presenting an area to be covered by a trim panel, a trim panel of relatively stiff material to be mounted on said supporting structure to cover said area and having an assembling slot provided on its underface in proximity to the adjacent peripheral edge thereof, and fastening means carried by said trim panel adapted for resiliently engaging the edge of said flange to rigidly secure the trim panel in mounted position on the supporting structure, said fastening means comprising an attaching member received in said assembling slot provided on the panel in a direction away from the adjacent peripheral edge thereof and a shank member designed for snap fastening engagement with the edge of said flange, said shank member comprising a pair of integral legs with one of said legs extending free in the path of the flange edge when normally untensioned and providing a shoulder adapted for substantial snap fastening engagement with said flange edge, said snap fastening engagement of said leg extending free operating to draw the trim panel to close, flush engagement with the flange of the supporting structure in mounted position and at the same time urge said attaching member of the fastening means toward positive connected engagement in the said assembling slot provided on the trim panel.

3. A trim panel assembly comprising in combination, a supporting structure having a flange and presenting an area to be covered by a trim panel, a trim panel of relatively stiff material to be mounted on said supporting structure to cover said area, and fastening means carried by said panel adapted for resiliently engaging the edge of said flange to rigidly secure the trim panel in mounted position on the supporting structure, said fastening means comprising an attaching member for securing the same to said panel and a shank member designed for snap fastening engagement with the edge of said flange, said shank member comprising a pair of integral relatively yieldable legs, one of said legs extending free in the path of said flange edge when normally untensioned and providing a shoulder designed for substantial snap fastening engagement with the edge of said flange, said snap fastening engagement of said leg extending free with the flange edge operating to draw the trim panel to close, flush engagement with the flange of the supporting structure in mounted position, said snap fastening engagement also permitting said trim panel to be readily mounted or dismounted from said supporting structure by substantial axial force applied in the area of said fastening means carried thereby.

GEORGE A. TINNERMAN.